Oct. 5, 1971 E. J. SIFF ET AL 3,610,051
TRANSDUCER PICK-UP MECHANISM
Filed Jan. 3, 1969

INVENTORS
ELLIOTT J. SIFF
IRVING SCHAFFER
NOBORU KONDO
BY
ATTORNEYS

United States Patent Office 3,610,051
Patented Oct. 5, 1971

3,610,051
TRANSDUCER PICK-UP MECHANISM
Elliott J. Siff, Westport, Irving Schaffer, Fairfield, and Noboru Kondo, Weston, Conn., assignors to Varo Inertial Products, Inc., Garland, Tex.
Filed Jan. 3, 1969, Ser. No. 788,716
Int. Cl. G01c *19/28*
U.S. Cl. 74—5                                                6 Claims

ABSTRACT OF THE DISCLOSURE

An improved pick-off mechanism for a transducer such as an accelerometer or gyroscope comprising a flexible cantilevered shaft mounted on a support, a follower on the unsupported end of the shaft, a sensing device for sensing movement of the follower upon flexing of the shaft, and connecting means for fixing the sensing device to the support independently of other structure.

BACKGROUND OF THE INVENTION

Field of the invention

This invention relates to sensing means for sensing the movement of the free end of a cantilevered shaft and for converting the movement into an electrical signal.

Description of the prior art

The devices to which the present invention is directed are the gyroscope of the U.S. Pat. No. 3,365,960 and the accelerometer of copending patent application, Ser. No. 518,291. Each of the devices disclosed in these patents includes a pick-off mechanism for sensing movement of the end of a flexible shaft about an axis extending perpendicular to the shaft axis. The present invention is particularly directed to an improved pick-off mechanism for such devices that is more reliable and less subject to inaccurate readings during use under variable or severe operating conditions. In construction, the gyroscope with which the improved pick-off mechanism of the present invention may be used includes a sealed outer casing and a support member fixed in the casing and to which the flexible shaft is cantilevered. The flexible support shaft has an inner portion which is affixed to the support member, and an outer end portion which defines the gyro spin axis. The outer end portion of the shaft is movable relative to the shaft inner end portion on a single flexure axis at right angle to the spin axis but is restrained against movement on all other axes relative thereto. The flexure axis defines the precession axis for the gyro; and a rotor rotatable about the spin axis is balanced at the intersection of the precession and spin axes.

The basic construction of the accelerometer with which the improved pick-off mechanism is adapted to be used is generally similar to that of the gyroscope. The difference is that the rotor and associated motor are replaced by an inertial mass supported on the outer end portion of the shaft and having a center of gravity located inwardly of the flexure axis of the shaft.

With both the gyroscope and accelerometer as described in the above mentioned patents, the pick-off mechanism includes an armature member and cooperating stator. The armature member is mounted on the extremity of the outer end portion of the support shaft for movement therewith while the stator is mounted directly onto the outer casing of the device in cooperating relationship with the armature. With such constructions whereby the stator of the pick-off mechanism is attached to the outer casing, any stresses, as for example mechanical or electrical, applied to the casing during use of the device would tend to cause motion of the stator with respect to its associated armature. This, in turn, will result in spurious output signals representing either a flexing of the shaft when in fact there is none or inaccurate readings of the actual flexing of the shaft.

SUMMARY OF THE INVENTION

The present invention resides in the placement of the stator of the pick-off mechanism independently of the outer casing of the device. More particularly, the stator is connected to the same support to which the flexible shaft is cantilevered. This support which is connected across the interior of the casing also holds the armature of the pick-off mechanism through the latter's mounting on the end of the shaft. Accordingly, stresses to which the outer casing may be subjected will not cause movement of the pick-off stator relative to the armature. Even if the outer casing is stressed to cause movement of the support itself, such movement will only cause movement of both the armature and stator and not relative movement between these members.

DESCRIPTION OF THE PREFERRED EMBODIMENT

Figure 1:
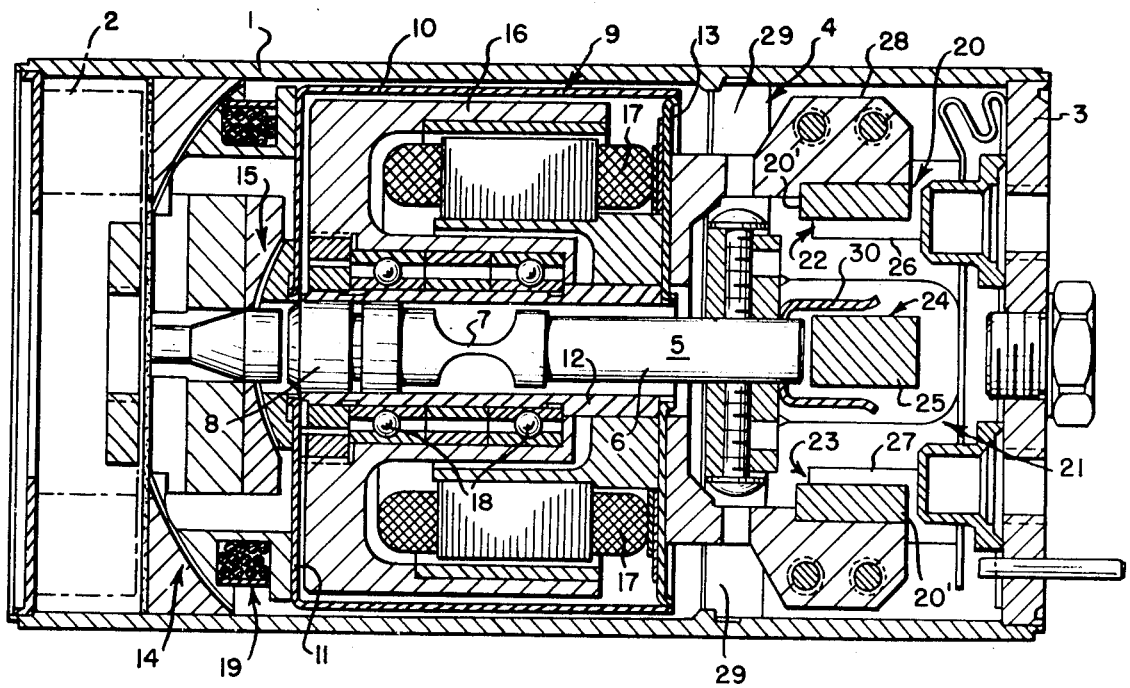
FIG. 1 is a cross-sectional view taken through the center line of the gyro incorporating the improved pick-off mechanism.

The basic description of the improved pick-off mechanism will be given with reference to the gyro in which it may be connected as shown in FIG. 1 of the drawings. Thereafter, the construction for mounting the pick-off mechanism in an accelerometer will be given with reference to FIG. 2. Also, since the construction of both the gyro and accelerometer, except for the pick-off mechanisms thereof, is generally the same as that of the devices described in the above mentioned patents, the present description thereof will be limited to that which is necessary for a complete understanding of the present invention.

As shown in FIG. 1, the gyro includes an outer housing 1. This housing, which is substantially cylindrical and may be only about an inch and a half long and one inch in diameter, is sealed at one end by a bellows structure represented by the dotted lines 2 and at the opposite end by a cover plate 3. All voids within the outer casing are completely filled by a damping liquid of predetermined viscosity, with the exception of one hollow subassembly within the outer casing. Toward the right hand end of the outer casing 1 as seen in FIG. 1, a support member 4 is fixed. This support member is a relatively heavy disc from the center of which a support shaft 5 is cantilevered toward the bellows end of the casing along its longitudinal axis. The support shaft 5 includes a first relatively small diameter portion 6 affixed with respect to the supporting member 4 and the outer casing 1, a flexible intermediate flat necked portion 7, and a relatively large diameter end portion 8 which is tiltable on a single precession axis defined by the flexure axis of the necked portion 7. Though the differing cross sections of the portions 6 and 8 of the shaft 5 are circular, the flat necked portion 7 is defined by rounded slots cut in opposition to one another across the shaft and is therefore left with a substantially rectangular web-like cross section. When a bending moment is applied to the movable end portion 8 of the shaft 5, flexure of the shaft occurs about the flexure axis extending diametrically through the shaft at the narrowest part of the flat necked portion 7. This flexure axis is the precession axis of the gyro. Only those bending moment forces acting about the precession axis will cause movement of the outer end portion 8 of the shaft 5, and ordinary torsional forces or other bending moments exerted will produce no measurable strain in the contemplated operation of the gyro.

Affixed coaxially on the relatively large diameter outer end portion of the support shaft is a sealed annular container 9 defined by a cylindrical body 10, an end wall 11, an inner sleeve 12, and an end wall 13. The container 9 and its contents are wholly supported on the outer end portion 8 of the support shaft by affixing of the sleeve 12 thereto.

All voids within the outer casing 1 are filled with the damping liquid except for the one within the container 9. An increase in the temperature of this damping liquid reduces its viscosity and permits easier movement of the container 9 and the outer shaft end portion 8 about the flat necked portion 7 of the shaft. Conversely, these elements encounter more resistance from the damping liquid when its viscosity increases as a result of a drop in temperature. Effective control on these variables is achieved by the construction generally designated at 14 and fully described in the above mentioned U.S. Pat. No. 3,365,- 960. Also, an additional temperature compensated damping mechanism 15 is provided.

Within the container 9 is a rotor 16 and energizing stator 17. The rotor is rotatably mounted concentrically to the outer end portion 8 of the shaft 5 by suitable bearings 18 while the stator is fixed to the outer end portion of the shaft by its attachment through the sleeve 12 of the container 9. The precession elements of the gyro consisting of the container 9, the rotor-stator assembly within it, and the movable shaft end portion 8 and other structure on the end portion 8 are balanced about a point coinciding with the intersection of the precession and spin axes within the flat necked shaft portion 7.

When the rotor 16 precesses during operation it may displace the container 9 angularly at a maximum of about three degrees in either direction about the flat necked shaft portion 7. The inner walls of the outer casing 1 or the inner end portion 6 of the support shaft provides a stop for limiting this angular motion of the container so as not to exceed the elastic limit of the flat necked shaft portion 7 thus assuring that the elasticity of the latter may be relied upon to restore the container and the movable shaft end portion 8 of their nominal rest or null position. If desired, a torque 19 may also be provided for augmenting the elastic restoring force of the flat necked portion 7.

Referring to the right hand end of FIG. 1, the improved pick-off mechanism of the present invention is shown. This mechanism is provided for translating the precession of the container 9 into an electrical signal and consists generally of a pick-off armature 20 and cooperating stator 21. The construction of the armature and stator is generally the same as that of the pick-off mechanism described in copending application, Serial No. 475,434, now U.S. Pat. No. 3,436,706.

The armature 20 may be of a magnetically permeable material. Advantageously the armature 20 is made of a nonmagnetic steel and is provided with laminated insets 20' of high magnetic permeability, the purpose of which is to increase the sensitivity of the pick-off means by localizing the flux. The stator is a unitary structure having two E-shaped members facing each other and joined together by the central leg. In FIG. 1, the ends of the outer legs of one half of the stator are shown at 22, 23 facing the viewer, the middle leg being shown at 24 in cross-section. The other half of the stator has the ends of its outer legs facing away from the viewer and toward the ends shown in FIG. 1. The stator is made of a magnetically permeable material, and the center leg defines a primary core member 25 having primary coils wound thereon. The coils are spaced from each other along the central leg inside the outer legs of each half of the stator and wound in the same direction. The primary coils are connected to a source of alternating electric current which, in accordance with the well-known principles of magnetic induction, generate a magnetic flux in the primary core 25.

The stator 21 further comprises two pairs of opposed secondary core members defined by the facing outer legs of the E's. The first pair, one of which is shown at 26, is located in spaced relationship from one side of the primary core 25. The second pair of opposed secondary core members, one of which is shown at 27, is located in spaced relationship from the other side of the primary core 25.

The secondary cores comprising a given pair are each in substantial alignment with the other and spaced to provide a gap through which an end of the armature 20 may pass freely. Thus, one pair of secondary cores provide a gap through which one of the insets 20' of armature may pass while the other pair of secondary cores provide a similar gap through which the other inset 20' may pass.

The primary coil of the primary core 25 generates a magnetic flux which radiates through the secondary cores and tends to generate electric potentials in the secondary coils. The secondary coils are wound at an opposite hand to each other and therefore there is no net potential difference when the armature 20 is in the null position. However, when the armature 20 moves within the magnetic field of the stator 21 due to a flexing of the shaft 5, an imbalance in the flux is created in the secondary cores of the stator because of the changed positions of the magnetically permeable insets 20'. This imbalance is reflected as a net potential difference in the secondary coils thereby generating a signal corresponding to the flexing of the shaft 5. The signal can then be read as a measure of precession.

In accordance with the teachings of the present invention, the armature of the pick-off mechanism is mounted onto the back end wall 13 of the container 9 by way of a yoke member 28. The yoke member is, in turn, connected to the end wall 13 by suitable means, such as cementing, and extends through clearance openings 29 in the support member 4 and into position between the opposed faces of the stator 21. By the connection of the container 9 to the outer end portion 8 of the shaft 5, and the connection of the shaft to the support member, the armature is, in effect, connected to the support member. The stator 21 is also connected to the support member; and as shown in FIG. 1, this connection is effected by means of a resilient clip 30. The clip holds the primary core 25 onto the support plate at the back end of the shaft 5. With this construction, the stator is completely spaced from the outer casing 1 of the device and thus not directly subject to distortion upon stressing or distortion of the outer casing. Accordingly, the outer casing acts only as a cover and container for the fluid as far as the pick-off mechanism is concerned. Any stresses of the outer casing will not directly affect the positioning of the stator 21 since the stator is spaced therefrom. Also, if the stresses are severe enough to cause distortion of the support member, this will not affect the relative positioning of the armature and stator of the pick-off mechanism and thus the accuracy of its sensing functions because both of these members are mounted onto the support member. It is seen from the above that the operation of the pick-off mechanism is essentially independent of the ambient conditions in which the gyro is used. Accordingly, a highly accurate and dependable sensing of precession is obtained.

Figure 2:
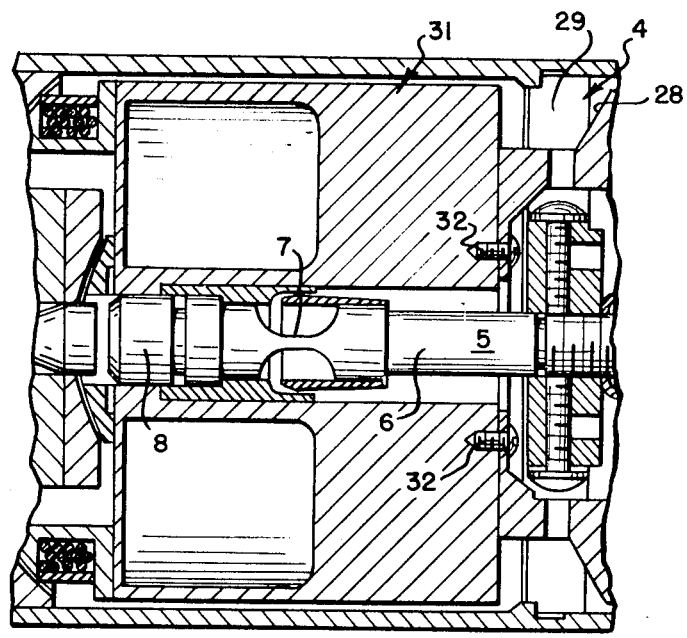
FIG. 2 is a partial cross-sectional view similar to FIG. 1 showing the accelerometer and the mounting of the improved pick-off mechanism therein.

The pick-off mechanism described above is also suited for use in an accelerometer such as shown in FIG. 2. In construction, the accelerometer is the same as the gyro except for the fact that the container 9 and internal rotor and motor structure is replaced by an inertial mass 31 having a center of gravity located axially inwardly of the flexure axis 7 of the shaft 5.

The mass 31 is responsive to acceleration of the device to cause flexing of the shaft 5. The pick-off mechanism of the present invention as used in the accelerometer is identical to that shown in FIG. 1 with the armature simply being connected to the inertial mass, as by bolts 32, instead of to the container for the precession elements of the gyro.

In both the gyro and accelerometer constructions, the elements supported on the outer end portion 8 of the shaft, the precession elements in the gyro and the inertial mass elements in the accelerometer, generally constitute flexing means for causing flexing of the shaft 5. Also, in both constructions, the armature 20 of the pick-off mechanism constitutes follower means for the outer end portion of the shaft 5 while the stator 21 constitutes sensing means for sensing movement of the follower means.

We claim:

1. In a transducer including a casing, a support member fixed within the casing and extending across the interior thereof, a support shaft cantilevered from the support member within said casing and having an inner end portion fixed to said support member, an outer end portion movable relative to the inner end portion, and an intermediate flexible portion having a flexure axis at right angles to the shaft axis, and shaft flexing means supported on the outer end portion of the shaft and movable therewith about said flexure axis, said flexing means being operative to flex the outer end portion of said shaft about said flexure axis, the improvement consisting of a pick-off mechanism comprising:

(a) follower means for the outer end portion of the said shaft, said outer end portion being disposed on one side of said support member within said casing, said follower means being mounted on said flexing means for movement therewith about said flexure axis, said flexing means being disposed within said casing on said one side of the support member and said follower means extending through said support member to the other side thereof; and (b) sensing means for sensing movement of said follower means, said sensing means being mounted on said support member independently of and spaced from said casing on the other side of said support member.

2. In the device of claim 1 wherein:
(a) said shaft flexing means comprises an inertial mass having a center of gravity which is located axially inwardly of said flexure axis.

3. In the device of claim 2 wherein:
(a) said follower means comprises a pick-off armature disposed for movement in a plane which is perpendicular to the common plane in which the flexure axis and longitudinal axis of said shaft lie;
(b) said sensing means comprises coil-wound core means opposed to one another on opposite sides of said armature for establishing a field through which said armature moves to produce a signal when said inertial mass moves.

4. In the device of claim 1 wherein:
(a) the outer end portion of said shaft defines a gyro spin axis;
(b) said flexure axis defines a precession axis disposed at right angles to said spin axis; and
(c) said shaft flexing means comprises
(1) a rotor rotatably supported on the outer end portion of said shaft for rotation about said spin axis, and
(2) means for rotating said rotor.

5. In the device of claim 4 wherein:
(a) said follower means comprises a pick-off armature disposed for movement in a plane which is perpendicular to the common plane in which said precession and spin axes lie;
(b) the outer end portion of said shaft and the elements supported thereby constitute gyro precession elements which are movable about said precession axis and balanced about the intersection of said precession and spin axis; and
(c) said sensing means comprises coil-wound core means opposed to one another on opposite sides of said armature for establishing a field through which said armature moves to produce a signal when said precession elements precess.

6. In the device of claim 5 further including:
(a) a sealed container fixed to the outer end portion of said shaft and enclosing said rotor and said means for rotating said rotor; and
(b) means for mounting said pick-off armature bar to said support member.

References Cited

UNITED STATES PATENTS

| | | | |
|---|---|---|---|
| 2,893,247 | 7/1959 | Stern et al. | 74—5.6 |
| 3,365,960 | 1/1968 | Siff et al. | 74—5 X |
| 3,430,276 | 3/1969 | Ashley et al. | 74—5 |
| 3,442,143 | 5/1969 | Schlitt | 74—5.6 |
| 3,452,609 | 7/1969 | Goodhue et al. | 74—5.6 |

MANUEL A. ANTONAKAS, Primary Examiner

U.S. Cl. X.R.

74—5.6